United States Patent
Yamakawa

(10) Patent No.: US 9,864,556 B2
(45) Date of Patent: Jan. 9, 2018

(54) IMAGE FORMING APPARATUS HAVING WEB BROWSER, METHOD OF CONTROLLING IMAGE FORMING APPARATUS, AND STORAGE MEDIUM

(71) Applicant: CANON KABUSHIKI KAISHA, Tokyo (JP)

(72) Inventor: Junichi Yamakawa, Hiratsuka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/476,360

(22) Filed: Sep. 3, 2014

(65) Prior Publication Data
US 2015/0062645 A1    Mar. 5, 2015

(30) Foreign Application Priority Data
Sep. 4, 2013    (JP) ................ 2013-182979

(51) Int. Cl.
*G06F 3/12* (2006.01)
*H04L 29/08* (2006.01)

(52) U.S. Cl.
CPC .......... *G06F 3/1236* (2013.01); *G06F 3/1204* (2013.01); *G06F 3/1285* (2013.01); *H04L 67/02* (2013.01); *G06F 3/1271* (2013.01)

(58) Field of Classification Search
USPC ..................................................... 358/1.15
See application file for complete search history.

(56) References Cited

U.S. PATENT DOCUMENTS

| | | | |
|---|---|---|---|
| 8,503,009 B2 | 8/2013 | Suzue | |
| 8,874,173 B2* | 10/2014 | Shigeta ............ | H04M 1/72519 358/1.15 |
| 8,879,079 B2 | 11/2014 | Kuroda | |
| 9,088,488 B2 | 7/2015 | Zenju | |
| 2002/0144023 A1* | 10/2002 | Kawabuchi .......... | G06F 3/1204 710/5 |

(Continued)

FOREIGN PATENT DOCUMENTS

| | | |
|---|---|---|
| JP | 2009251931 A | 10/2009 |
| JP | 4440173 B2 | 3/2010 |

(Continued)

OTHER PUBLICATIONS

Office Action issued in Japanese Patent Application No. 2013-182979 dated Jun. 13, 2017.

*Primary Examiner* — Kevin Ky
(74) *Attorney, Agent, or Firm* — Rossi, Kimms & McDowell LLP

(57) ABSTRACT

An image forming apparatus which makes a web page of peripheral equipment such as a print controller connected to the image forming apparatus available without the need to manually register the web page of the peripheral equipment as a favorite or the like in a web browser installed in the image forming apparatus. A determination unit determines whether the print controller is connected to the image forming apparatus via an interface. A generation unit generates a URL including an IP address or a host name of the print controller. A display unit displays an icon for accessing a web page corresponding to the URL in a case where the determination unit determines that the print controller is connected to the image forming apparatus.

15 Claims, 13 Drawing Sheets

(56) References Cited

U.S. PATENT DOCUMENTS

| | | | |
|---|---|---|---|
| 2004/0010795 A1* | 1/2004 | Sasaki | G06F 9/4411 719/321 |
| 2005/0058487 A1* | 3/2005 | Utsubo | G06Q 20/102 400/76 |
| 2005/0242178 A1* | 11/2005 | Minowa | G06Q 30/0225 235/383 |
| 2006/0026434 A1* | 2/2006 | Yoshida | G06F 21/608 713/182 |
| 2006/0129912 A1 | 6/2006 | Kunori | |
| 2007/0127053 A1* | 6/2007 | Tominaga | G06F 3/121 358/1.14 |
| 2008/0027914 A1* | 1/2008 | Caputo | G06F 17/30884 |
| 2008/0117452 A1* | 5/2008 | Murakami | G06F 21/608 358/1.15 |
| 2010/0074633 A1* | 3/2010 | Kuwasaki | 399/8 |
| 2010/0208301 A1* | 8/2010 | Zenju | H04L 29/12207 358/1.15 |
| 2012/0092691 A1* | 4/2012 | Sasakuma | 358/1.13 |
| 2013/0003111 A1* | 1/2013 | Mitsubori | 358/1.15 |
| 2013/0107318 A1* | 5/2013 | Yamada | 358/1.15 |
| 2014/0139878 A1* | 5/2014 | Kadota | G06K 15/183 358/1.15 |

FOREIGN PATENT DOCUMENTS

| | | |
|---|---|---|
| JP | 2010193166 A | 9/2010 |
| JP | 2013050775 A | 3/2013 |

* cited by examiner

IMAGE FORMING APPARATUS HAVING WEB BROWSER, METHOD OF CONTROLLING IMAGE FORMING APPARATUS, AND STORAGE MEDIUM

BACKGROUND OF THE INVENTION

Field of the Invention

The present invention relates to an image forming apparatus having a web browser and connectable to a network, a control method of controlling operation of the image forming apparatus, and a storage medium.

Description of the Related Art

A web browser that accesses a web server on a network and receives and displays various contents provided by the web server is installed in not only personal computers but also image forming apparatuses such as printers and copiers (see Japanese Patent Publication No. 4440173).

There has been a technique of using such a web browser installed in image forming apparatuses not only for the purpose of viewing information on the Internet but also as a user interface (hereafter referred to as "a web operation unit") of a main body of an image forming apparatus or peripheral equipment such as a print control apparatus (hereafter referred to as "a print controller") connected to the image forming apparatus. Specifically, the web operation unit is a web page, and for example, its URL is registered in advance as a start page or a favorite (hereafter referred to as "a favorite or the like") in a web browser of the image forming apparatus and called from a touch panel of the image forming apparatus so as to be used. It should be noted that "favorites" are also called bookmarks or a hotlist.

However, when a web operation unit of peripheral equipment is to be registered as a favorite or the like in a web browser installed in an image forming apparatus, a problem explained hereafter arises. Specifically, peripheral equipment connectable to an image forming apparatus is not always connected to the image forming apparatus, and hence a web operation unit of the peripheral equipment cannot be registered as a favorite or the like in advance in a web browser installed in the image forming apparatus. Moreover, when peripheral equipment is connected to an image forming apparatus, it is necessary to do software keyboard input from a touch panel of the image forming apparatus so as to register a web operation unit of the peripheral equipment as a favorite or the like in a web browser installed in the image forming apparatus. In this case, an input operation is complicated and lacks workability because it involves input of a URL including symbols such as colons.

SUMMARY OF THE INVENTION

The present invention provides an image forming apparatus which makes a web operation unit of peripheral equipment such as a print controller connected to the image forming apparatus available without the need to manually register the web operation unit of the peripheral equipment as a favorite or the like in a web browser installed in the image forming apparatus, a control method for the an image forming apparatus, and a computer-readable storage medium storing a program for implementing the control method.

Accordingly, a first aspect of the present invention provides an image forming apparatus comprising a determination unit configured to determine whether a print controller is connected to the image forming apparatus via the interface, a generation unit configured to generate a URL including an IP address or a host name of the print controller, and a display unit configured to display an icon for accessing a web page corresponding to the URL in a case where the determination unit determines that the print controller is connected to the image forming apparatus.

Accordingly, a second aspect of the present invention provides a control method for an image forming apparatus comprising a determination step of determining whether a print controller is connected to the image forming apparatus via the interface, a generation step of generating a URL including an IP address or a host name of the print controller, and a display step of displaying an icon for accessing a web page corresponding to the URL in a case where it is determined that the print controller is connected to the image forming apparatus in the determination step.

Accordingly, a third aspect of the present invention provides a non-transitory computer-readable storage medium storing a program for causing a computer of an image forming apparatus to execute a control method for the image forming apparatus, the control method comprising a determination step of determining whether a print controller is connected to the image forming apparatus via the interface, a generation step of generating a URL including an IP address or a host name of the print controller, and a display step of displaying an icon for accessing a web page corresponding to the URL in a case where it is determined that the print controller is connected to the image forming apparatus in the determination step.

According to the present invention, a web page of the print controller connected to the image forming apparatus is made available without the need to manually register the web page of the print controller as a favorite or the like in the web browser installed in the image forming apparatus. As a result, the image forming system including the image forming apparatus and the print controller can be constructed with ease, and the print controller can be managed using the image forming apparatus with ease.

Further features of the present invention will become apparent from the following description of exemplary embodiments (with reference to the attached drawings).

DESCRIPTION OF THE EMBODIMENTS

The present invention will now be described with reference to the drawings showing embodiments thereof. A multiple function peripheral (hereafter referred to as "the MFP") is taken as an exemplary an image forming apparatus according to the embodiments of the present invention. The present invention, however, is not limited to this, but may be applied to, for example, a copier, a scanner, or a printer.

Figure 1:
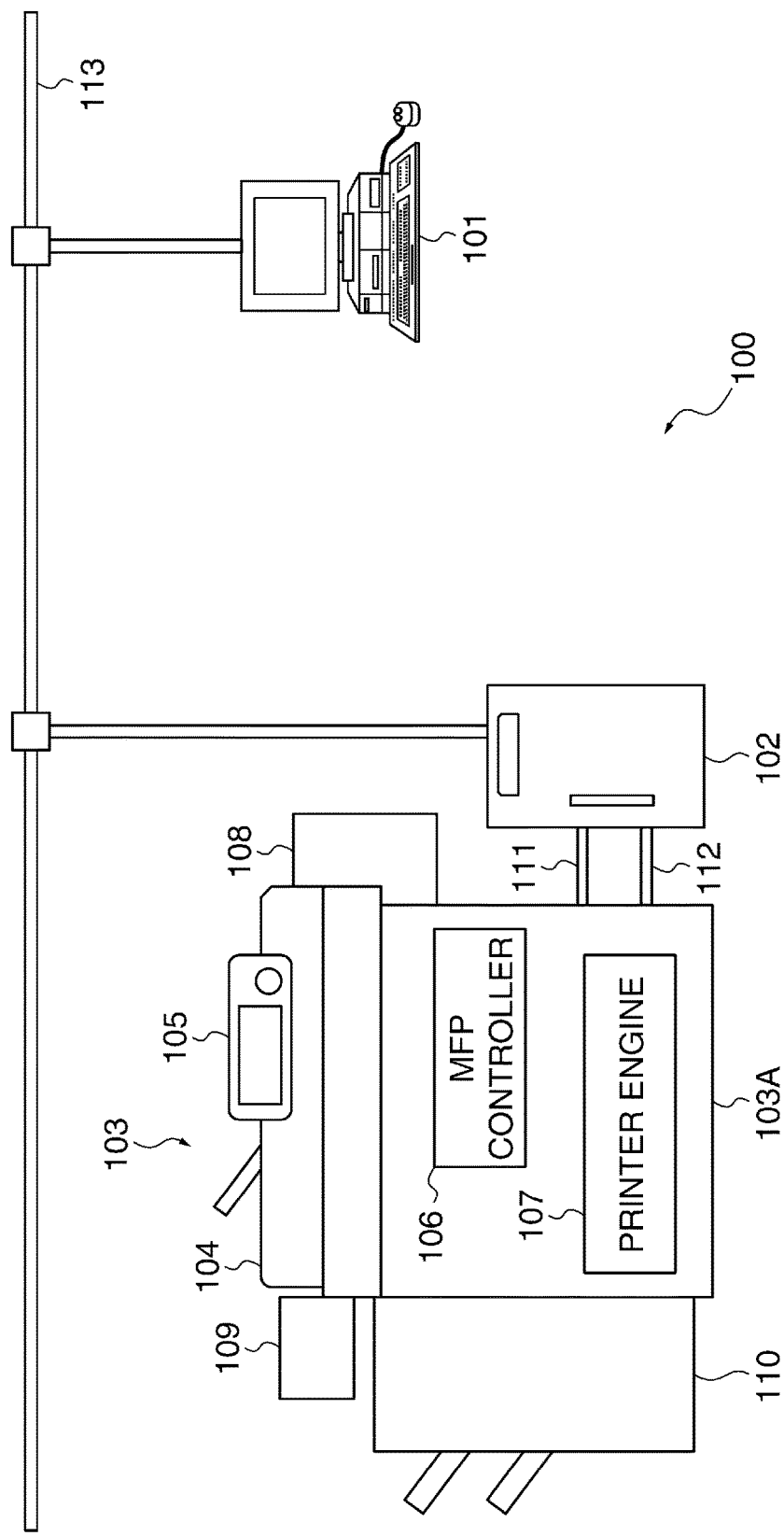
FIG. 1 is a view schematically showing a system arrangement of an image forming system according to a first embodiment of the present invention.

FIG. 1 is a view schematically showing a system arrangement of an image forming system according to a first embodiment of the present invention. The image forming system 100 has a client computer 101, a PDL (page description language) controller 102 (print controller), and an MFP 103. The client computer 101 and the PDL controller 102 are connected to each other via a LAN cable (Ethernet (registered trademark) cable) 113. The PDL controller 102 and the MFP 103 are connected to each other via a PDL control cable 111, which is an Ethernet (registered trademark) cable through which a control signal for PDL print flows, and an image transfer video cable 112. It should be noted that the PDL controller 102 is an exemplary peripheral device connectable to the MFP 103. The client computer 101 and the PDL controller 102 may be connected to each other via a wireless LAN.

The MFP 103 is usable as a printer, a copier, and a facsimile, and has a main body unit 103A, a reader scanner 104, an operation unit 105, a facsimile unit 108, an IC card reader 109, and a finisher 110. The main body unit 103A has an MFP controller 106, and a printer engine 107.

In the main body unit 103A, the printer engine 107 performs image formation (printing) on a predetermined sheet using an image forming material such as toner although this is not illustrated in detail. A detailed description will be given later of the MFP controller 106 as well as an arrangement of the PDL controller 102.

The reader scanner 104, which has an auto document feeder, reads an image off an original to create image data. The operation unit 105 is comprised of a touch panel, which is a display device, and hardware buttons such as a start button. The facsimile unit 108, which is connected to a telephone line, not shown, sends and receives image data to and from external apparatuses via the telephone line. The IC card reader 109 reads information written on an IC card which a user has, and the MFP 103 is made available by successful authentication of the user based on the read information. The finisher 110 performs processes such as stapling, sorting, and shifting on a printed sheet.

The user operates the client computer 101, activates an application, and performs printing using the MFP 103 through the medium of the PDL controller 102.

Figure 2:
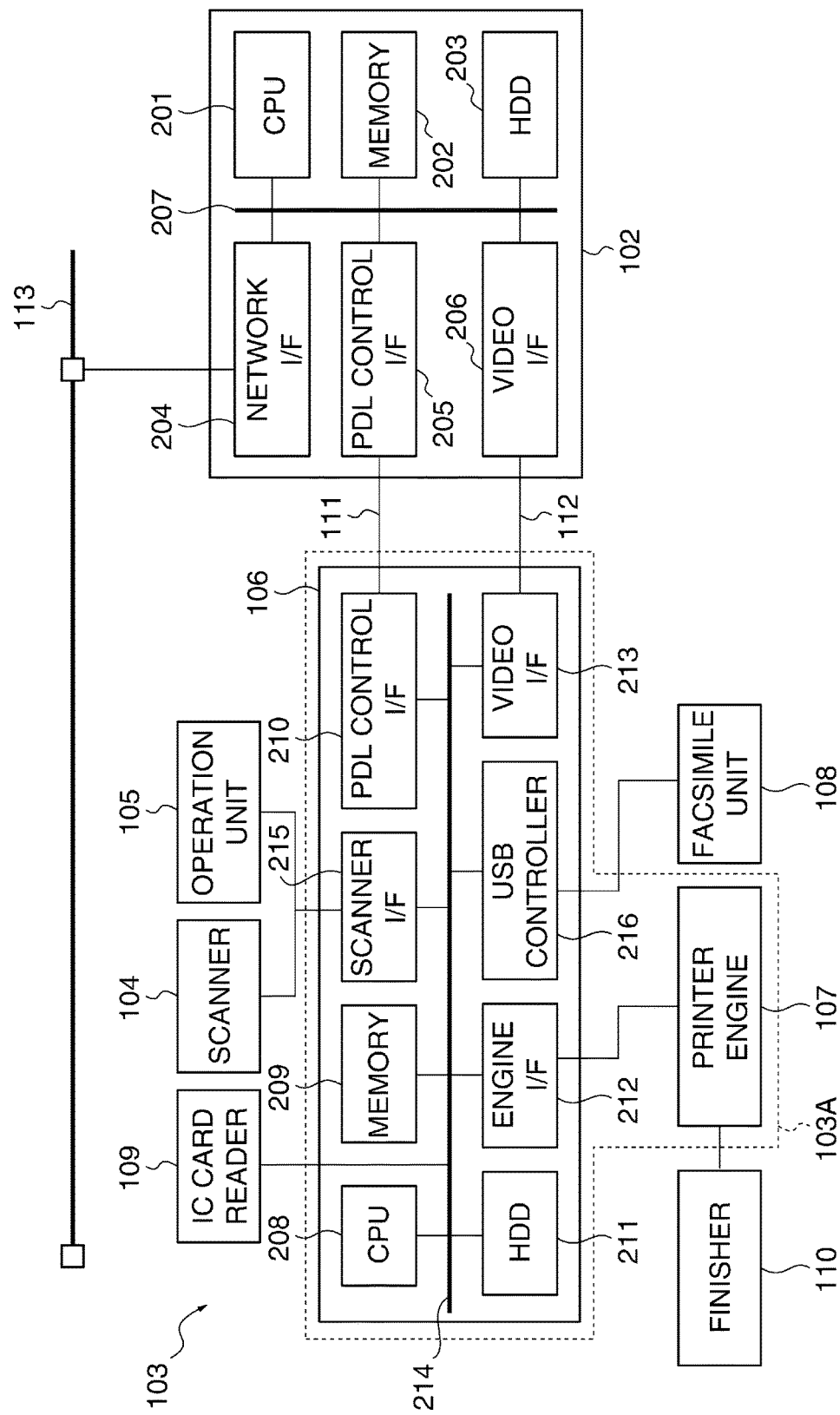
FIG. 2 is a block diagram schematically showing hardware arrangements of a PDL controller and an MFP which the image forming system in FIG. 1 has.

FIG. 2 is a block diagram schematically showing hardware arrangements of the PDL controller 102 and the MFP 103. The PDL controller 102 has a CPU 201, a memory 202, an HDD 203, a network I/F 204, a PDL control I/F 205, and a video I/F 206, and they are connected to one another via a system bus 207 so that they can communicate with one another.

The CPU 201 controls the overall operation of the PDL controller 102 by executing programs stored in the HDD 203 and controlling component elements constituting the PDL controller 102 via the system bus 207. The memory 202 is used as a temporary storage region for use in decompressing images of PDL data and as work memory for the CPU 201. The HDD (hard disk drive) 203, which is a mass storage device, stores various control programs which are to be executed by the CPU 201, and a web server (software) 402, to be described later, is included in the various control programs. It should be noted that the HDD 203 is used as a temporary storage area and a saving area for data which are processed by the CPU 201.

The network I/F 204 is an interface for carrying out communications with an external apparatus such as the client computer 101. The PDL control I/F 205 is an interface for controlling a PDL printing process and sending and receiving control commands to and from the MFP 103. The video I/F 206 is an interface for sending and receiving image data to and from the MFP 103.

As for the MFP 103, an arrangement of the MFP controller 106 which the main body unit 103A has will be described, and duplicate description of other elements is omitted here. The MFP controller 106 has a CPU 208, a memory 209, a PDL control I/F 210, an HDD 211, an engine I/F 212, a video I/F 213, a scanner I/F 215, and a USB controller 216, and they are connected to one another via a system bus 214 so that they can communicate with one another.

The CPU 208 controls the overall operation of the MFP 103 by executing programs stored in the HDD 211 and controlling component elements constituting the MFP 103 via the system bus 214. The memory 209 is used as a temporary storage region for various data handled by the MFP 103 and as work memory for the CPU 208. The HDD (hard disk drive) 211, which is a mass storage device, stores various control programs which are to be executed by the CPU 208, and a web browser (software) 404, to be described later, is included in the various control programs. It should be noted that the HDD 211 is used as a temporary storage area and a save area for data which are processed by the CPU 208.

The PDL control I/F 210 is an interface for controlling a PDL printing process for performing printing by the printer engine 107, and sending and receiving control commands to and from the PDL controller 102. The engine I/F 212 is an interface that is responsible for controlling communication with the printer engine 107. The scanner I/F 215 is an interface for transmission and reception of control commands and image data between the reader scanner 104 and the operation unit 105 and the CPU 208.

The USB controller 216, which is connected to the facsimile unit 108, enables the facsimile unit 108 and the CPU 208 to send and receive control commands and image data to and from each other. The video I/F 213 is an interface for sending and receiving image data to and from the PDL controller 102. It should be noted that the IC card reader 109 is connected to the system bus 214, and the printer engine 107 and the finisher 110 are connected to each other via a dedicated cable.

Figure 3:
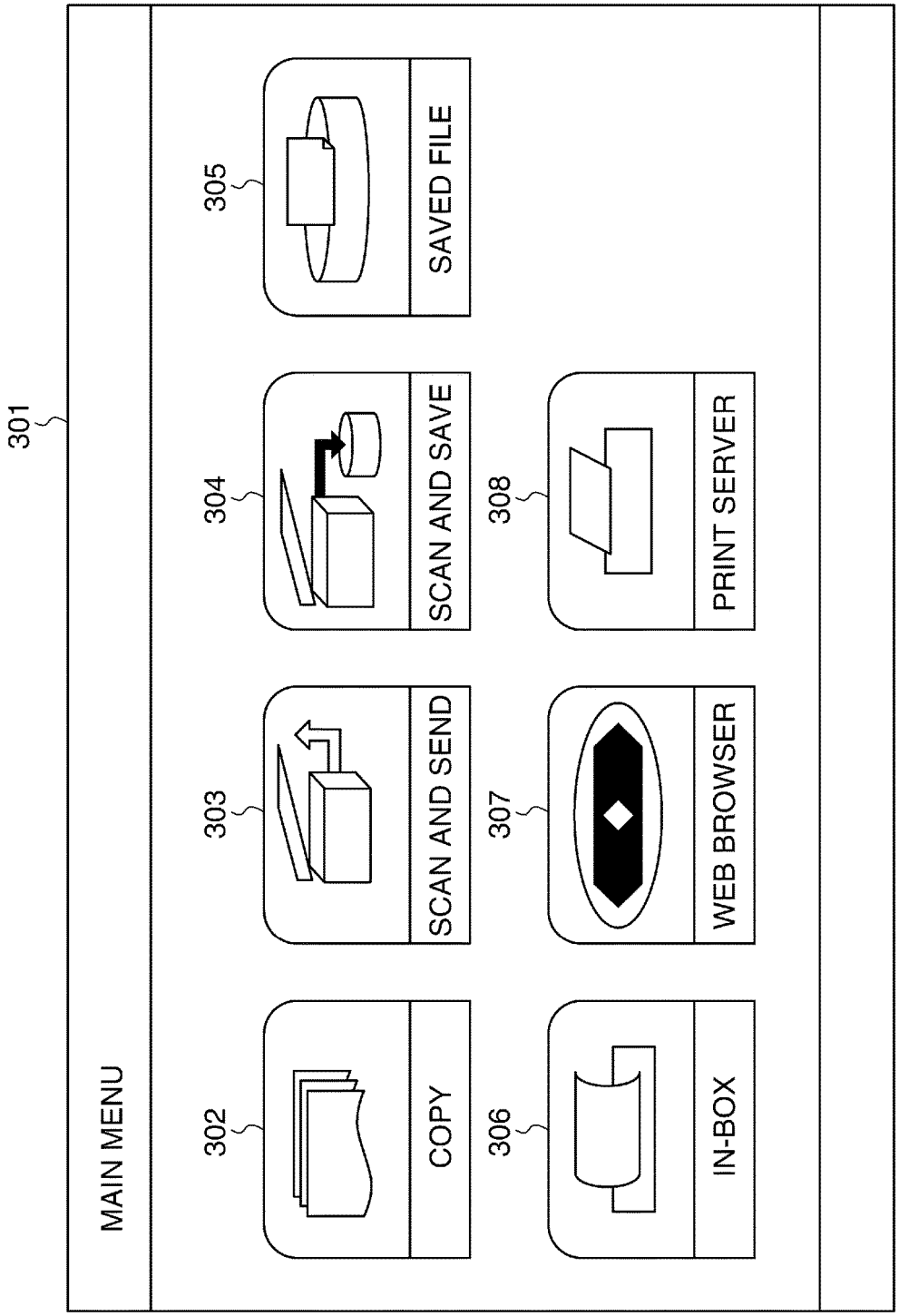
FIG. 3 is a view showing an exemplary touch panel of the MFP which the image forming system in FIG. 1 has.

FIG. 3 is a view showing an exemplary touch panel 301 which the operation unit 105 of the MFP 103 has. The touch panel 301 is, for example, a liquid crystal display having a touch panel function. A main menu in FIG. 3 is displayed on the touch panel 301 by, for example, depressing a home button (not shown) which the operation unit 105 has.

Displayed on the main menu are a copy icon 302, a scan and send icon 303, a scan and save icon 304, a saved file icon 305, an in-box icon 306, a web browser icon 307, and a print server icon 308 are displayed. It should be noted that the icons displayed on the main menu are not limited to them. By depressing these icons displayed on the main menu, functions of the depressed icons can be called.

The copy icon 302 calls a copy function. The scan and send icon 303 calls a function of sending an image scanned in by the reader scanner 104 to an external apparatus. The scan and save icon 304 calls a function of storing an image, which is scanned in by the reader scanner 104, in the HDD 211. The saved file icon 305 calls a function of printing or sending image data stored in the HDD 211. The in-box icon 306 calls a function of receiving facsimiles and electronic mails. The web browser icon 307 calls the web browser 404, which will be described later (see FIG. 4). The print server icon 308 calls a web operation unit (the web server 402 (see FIG. 4)) of the PDL controller 102, which will be described later. It should be noted that a name and URL of the web operation unit has to be registered in advance as a favorite in a web browser (also referred to as a bookmark or hotlist) so that the print server icon 308 can be displayed on the main menu.

Figure 4:
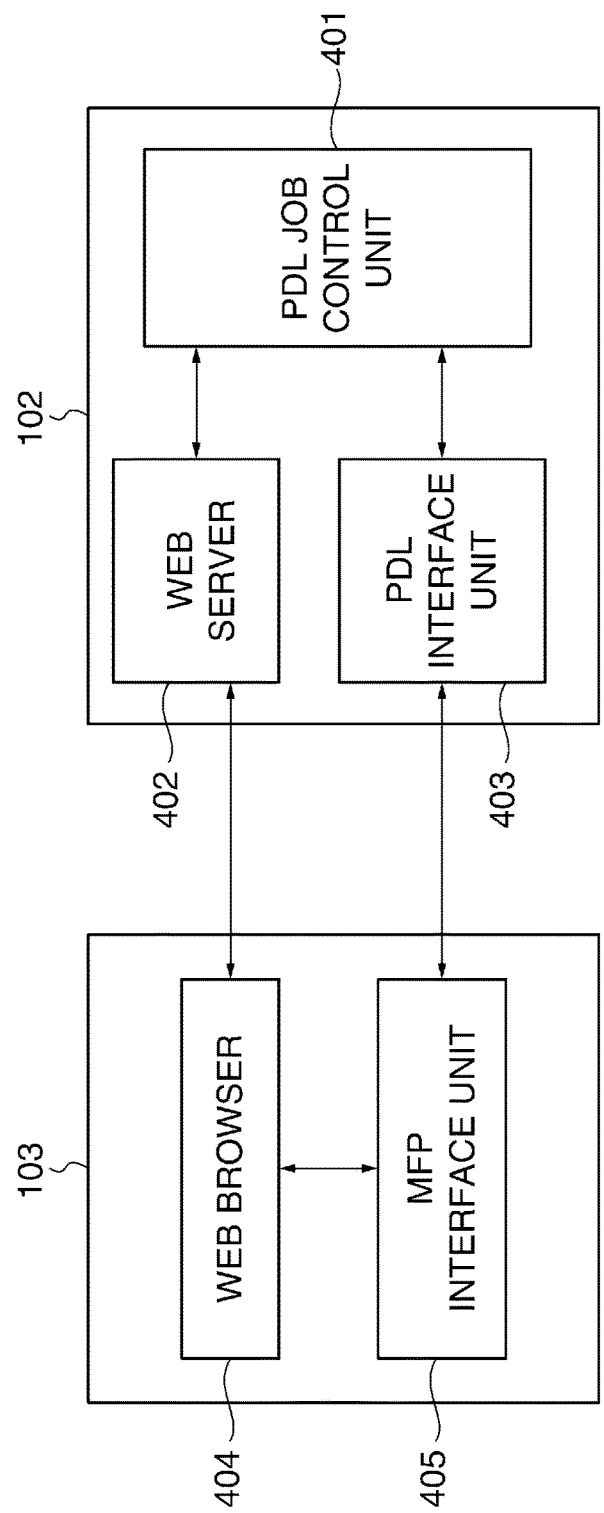
FIG. 4 is a block diagram schematically showing software arrangements of the PDL controller and the MFP which the image forming system in FIG. 1 has.

FIG. 4 is a block diagram schematically showing software arrangements of the PDL controller 102 and the MFP 103. The PDL controller 102 is installed with a PDL job control unit 401, the web server 402, and a PDL interface unit 403, which are software (programs). The MFP 103 is also installed with the web browser 404 and an MFP interface unit 405, which are software (programs).

The PDL job control unit 401, the web server 402, and the PDL interface unit 403 are expanded into the memory 202, called from the programs, and executed by the CPU 201. The PDL job control unit 401 processes and controls reception of print jobs from the client computer 101, decompression processing, issuance of instructions to the PDL interface unit 403, transmission of image data, and so on. The PDL interface unit 403 authenticates connection with the MFP 103, sends and receives statuses to and from the MFP 103, inputs jobs to the MFP 103, sends image data to the MFP 103, and synchronizes to the MFP 103. The web server 402 executes a setting program for the PDL controller 102 and displays and reprints print jobs in the PDL controller 102. The web server 402 has a deletion program, a calibration program, and an image position adjustment program placed therein, and executes predetermined programs in response to access from the web browser 404.

In the MFP 103, the web browser 404 and the MFP interface unit 405 are each expanded on the memory 209, called by the programs, and executed on the CPU 208. The web browser 404 accesses a web server on the Internet or the web server 402 running on the PDL controller 102 in accordance with an input URL to display information, and also executes the programs on the web server 402. In the MFP controller 106, the MFP interface unit 405 performs authentication of the PDL controller 102 and sends and receives statuses.

When the web browser icon 307 displayed on the touch panel 301 of the MFP 103 is depressed, the web browser 404 displays a start page, which is set up in advance, on the touch panel 301. When the print server icon 308 is depressed, the web browser 404 displays a content (web page) of the web operation unit of the web server 402 in the PDL controller 102, which is registered as a favorite.

Referring next to flowcharts of FIGS. 5 to 8, a description will be given of a process in which the web operation unit of the PDL controller 102 is automatically registered as a favorite in the web browser 404 of the MFP 103. It should be noted that when the MFP 103 has never been connected to the PDL controller 102, the web operation unit of the PDL controller 102 has not been registered as a favorite in the web browser 404. In this case, the print server icon 308, which is a web operation unit icon, is not displayed on the touch panel 301. The web browser 404 of the MFP 103 is made available by activating upon input of a license number. For this reason, when the web browser 404 has not been activated, it goes without saying that the web operation unit of the PDL controller 102 has not been registered as a favorite, and also, the web browser icon 307 is not displayed.

Therefore, first, the MFP 103 and the PDL controller 102 are connected to each other, power supply to each of them is turned on to start the MFP 103 and the PDL controller 102. When power supply is turned on, the MFP 103 and the PDL controller 102 each start a booting process.

Figure 5:
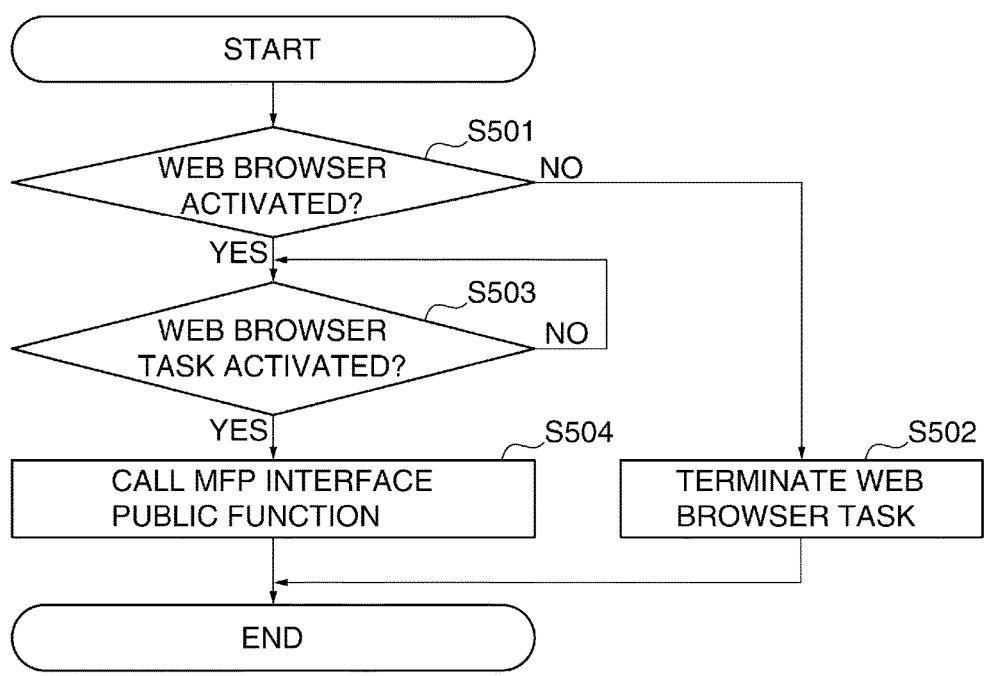
FIG. 5 is a flowchart showing a task process carried out by a web browser in the image forming system in FIG. 1 so as to automatically register a web operation unit of the PDL controller as a favorite in the web browser of the MFP.

FIG. 5 is a flowchart showing a task process carried out by the web browser 404 so as to automatically register the web operation unit of the PDL controller 102 as a favorite in the web browser 404 of the MFP 103. Processes in FIG. 5 are implemented by the CPU 208 expanding programs read out from the HDD 211 into the memory 209 and executing them.

In step S501, the web browser 404 checks a license of the web browser 404 and judges whether or not the web browser 404 has been activated (available). When the web browser 404 has not been activated (NO in S501), the process proceeds to step S502, in which the web browser 404 brings the task process to an end, followed by the process terminating.

On the other hand, when the web browser 404 has been activated (YES in S501), the process proceeds to step S503, in which the web browser 404 judges whether or not a task of the web browser 404 has been completely activated. When the task of the web browser 404 has not been completely activated (NO in S503), the web browser 404 stands by until the task of the web browser 404 has been completely activated. When the task of the web browser 404 has been completely activated (YES in S503), the process proceeds to step S504, in which the web browser 404 calls an MFP interface public function provided by the MFP interface unit 405. It should be noted that the MFP interface public function is a function for registration as a favorite in the web browser 404.

Figure 6:
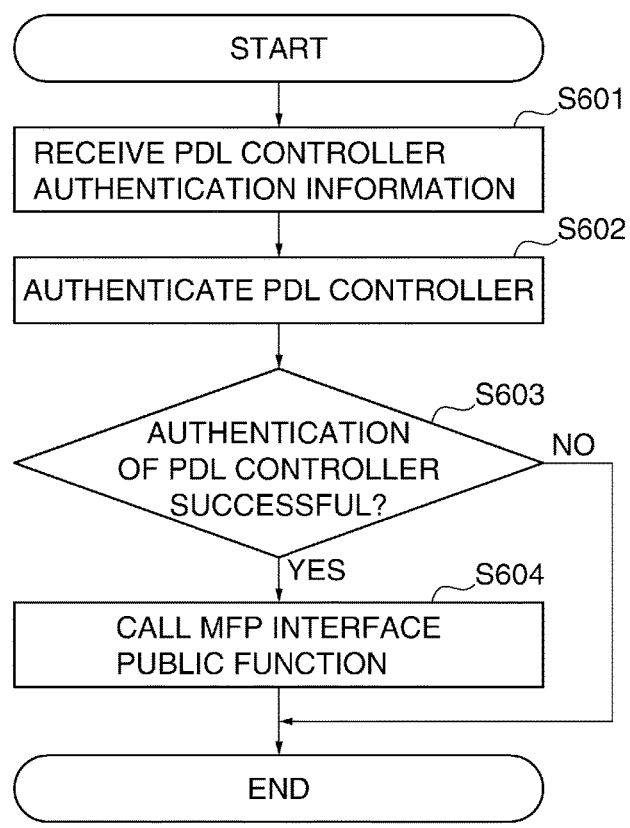
FIG. 6 is a flowchart showing a process carried out by an MFP interface unit in the image forming system in FIG. 1 so as to automatically register the web operation unit of the PDL controller as a favorite in the web browser of the MFP.

FIG. 6 is a flowchart showing a process carried out by the MFP interface unit 405 so as to automatically register the web operation unit of the PDL controller 102 as a favorite in the web browser 404 of the MFP 103. Processes in FIG.

6 are implemented by the CPU 208 expanding programs read out from the HDD 211 into the memory 209 and executing them.

After the PDL controller 102 is started, the PDL interface unit 403 of the PDL controller 102 sends authentication information to the MFP interface unit 405 via the PDL control cable 111. In response to this, in step S601, the MFP interface unit 405 receives the authentication information on the PDL controller 102. Then, in step S602, the MFP interface unit 405 performs authentication of the PDL controller 102 based on the received authentication information. Specifically, the MFP interface unit 405 judges whether or not the received authentication information is on a PDL controller authentication information list. As a result, when the received authentication information is on the PDL controller authentication information list, the MFP interface unit 405 sets a value for a PDL controller code, and when the received authentication information is not on the PDL controller authentication information list, the MFP interface unit 405 returns an authentication error to the PDL controller 102.

Then, in step S603, the MFP interface unit 405 judges whether or not the authentication of the PDL controller 102 in the step S602 is successful. When the authentication is successful (YES in S603), the process proceeds to step S604, in which the MFP interface unit 405 calls the MFP interface public function, followed by the process terminating. On the other hand, when the authentication is not successful (NO in S603), the process is terminated.

Figure 7:
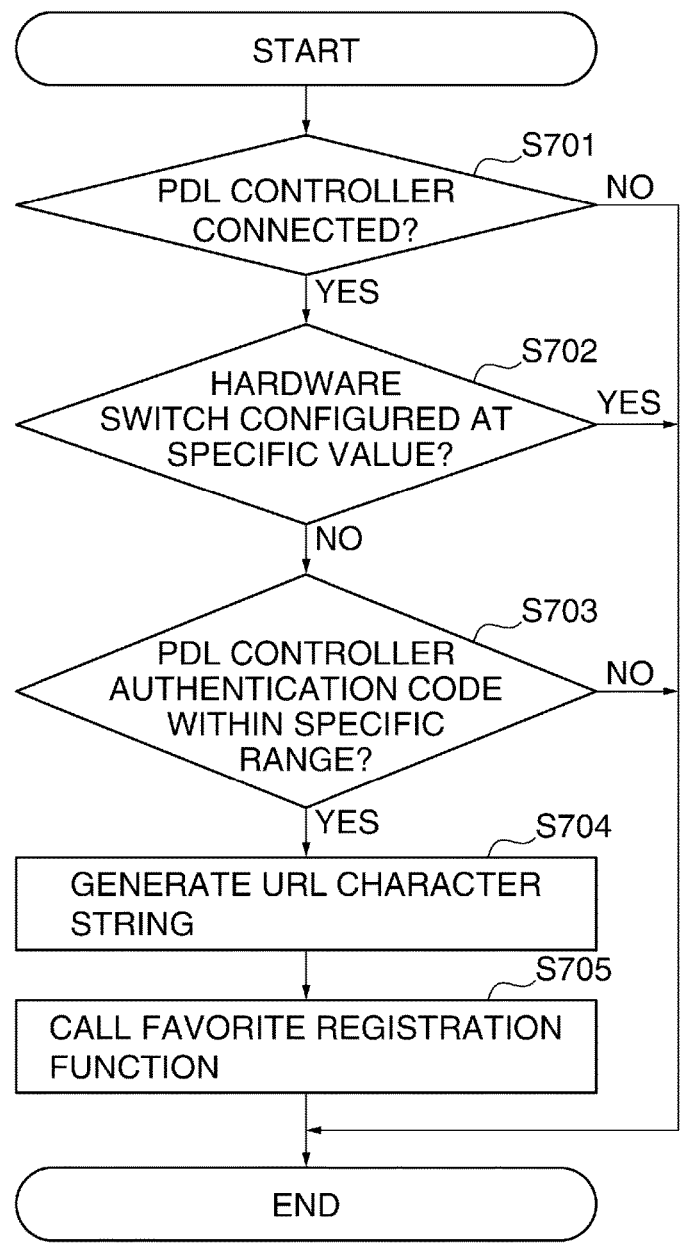
FIG. 7 is a flowchart showing a process on an MFP interface public function, which is carried out by the MFP interface unit after step S604 in FIG. 6.

FIG. 7 is a flowchart showing a process on the MFP interface public function, which is carried out by the MFP interface unit 405. Processes in FIG. 7 are implemented by the CPU 208 expanding programs read out from the HDD 211 into the memory 209 and executing them.

In step S701, the MFP interface unit 405 judges whether or not the PDL controller 102 is connected to the MFP 103. Specifically, when the PDL controller 102 is connected to the MFP 103, the PDL control cable 111 and the image transfer video cable 112 are connected to them, and the MFP controller 106 stores a connection state. Thus, the MFP interface unit 405 checks their connection state.

When the PDL controller 102 is not connected to the MFP 103 (NO in S701), the process is terminated. When the PDL controller 102 is connected to the MFP 103 (YES in S701), the process proceeds to step S702, in which the MFP interface unit 405 checks a state of a hardware switch mounted on the MFP controller 106 and judges whether or not the hardware switch is configured at a specific value. Specifically, the MFP 103 connectable to the PDL controller 102 comes in varying arrangements. For example, some models of the operation units 105 are comprised of hardware buttons and a touch panel; other models are comprised only of a touch panel, and to distinguish between them, a state of the hardware switch is read.

When there are no hardware buttons, and the hardware switch is configured at a specific value indicative of only a touch panel connected (YES in S702), the process is terminated. When the hardware switch is not configured at the specific value (NO in S702), the process proceeds to step S703, in which the MFP interface unit 405 checks a value of the PDL controller authentication code authenticated in the step S602 and judges whether or not the value lies inside a specific range. Specifically, each model of the PDL controller 102 has an authentication code, and a model of the PDL controller 102 which uses the web operation unit is determined by a manufacturer, and hence it is checked whether or not the authentication code lies inside a range assigned to a specific manufacturer.

When the authentication code does not lie inside the specific range (NO in S703), the process is terminated. When the authentication code lies inside the specific range (YES in S703), the process proceeds to step S704, in which the MFP interface unit 405 generates a name of the web operation unit and URL information (URL character string), which is to be registered as a favorite in the web browser 404. This character string is as follows:

Name: print server;

URL: http://(IP address of the PDL control I/F 205)/prnsrvlcd/index.html

It should be noted that part of the character string other than the IP address of the PDL control I/F 205 is fixed. The PDL control I/F 210 of the MFP controller 106 and the PDL control I/F 205 of the PDL controller 102 are network-connected to each other on a one-to-one basis. Accordingly, the IP address of the PDL control I/F 205 is held as an IP address of a gateway to the MFP controller 106 in the memory 209 of the MFP controller 106. Thus, by referring to the IP address of the gateway to the MFP controller 106, the MFP interface unit 405 obtains the IP address of the PDL control I/F 205 and generates a URL character string for the web operation unit. Then, in step S705, the web operation unit 405 sets the name and the URL information generated in the step S704 in a function (favorite registration function) for registration as a favorite in the web browser 404 and calls the function.

Figure 8:
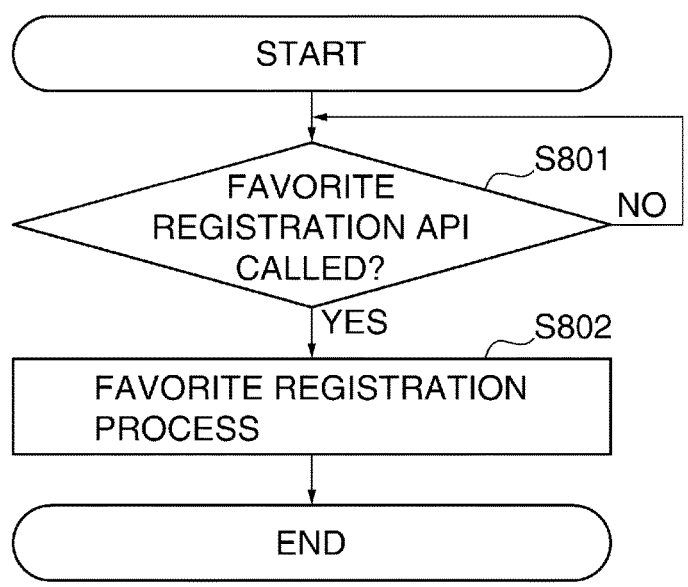
FIG. 8 is a flowchart showing a favorite registration process carried out by the web browser after step S705 in FIG. 7.

FIG. 8 is a flowchart showing a favorite registration process carried out by the web browser 404. Processes in FIG. 5 are implemented by the CPU 208 expanding programs read out from the HDD 211 into the memory 209 and executing them.

In step S801, the web browser 404 judges whether or not a favorite registration API has been called and stands by until the favorite registration API has been called (NO in S801). When the favorite registration API has been called (NO in S801), that is, the MFP interface unit 405 calls the favorite registration function (YES in S801), the process proceeds to step S802. In the step S802, according to settings specified in the favorite registration function, the web browser 404 registers the URL of the web operation unit corresponding to the IP address of the PDL control I/F 205 as a favorite in the web browser 404 and displays the print server icon 308 on the main menu of the touch panel 301.

As described above, according to the first embodiment, the web operation unit of the PDL controller 102 connected to the MFP 103 can be automatically registered as a favorite in the web browser 404. As a result, the image forming system 100 can be constructed with ease without performing complicated operations such as inputting the URL of the web operation unit of the PDL controller 102 using a software keyboard or the like from the touch panel of the MFP 103.

In the first embodiment described above, the MFP interface unit 405 generates the URL of the web operation unit of the PDL controller 102 and registers it as a favorite in the web browser 404 of the MFP 103. In this case, when another PDL controller 102 provides a web operation unit and the web operation unit of the other PDL controller 102 uses another URL, a problem that it is necessary to change software of the MFP controller 106 arises. To address this problem, according to a second embodiment, the PDL controller 102 carries out a process in which it registers its own web operation unit as a favorite in the web browser 404 of the MFP 103. It should be noted that the second embodiment differs from the forth embodiment only in software arrangement of the image forming system 100, but their hardware arrangements are the same, and therefore, description of the hardware arrangement is omitted.

Figure 9:
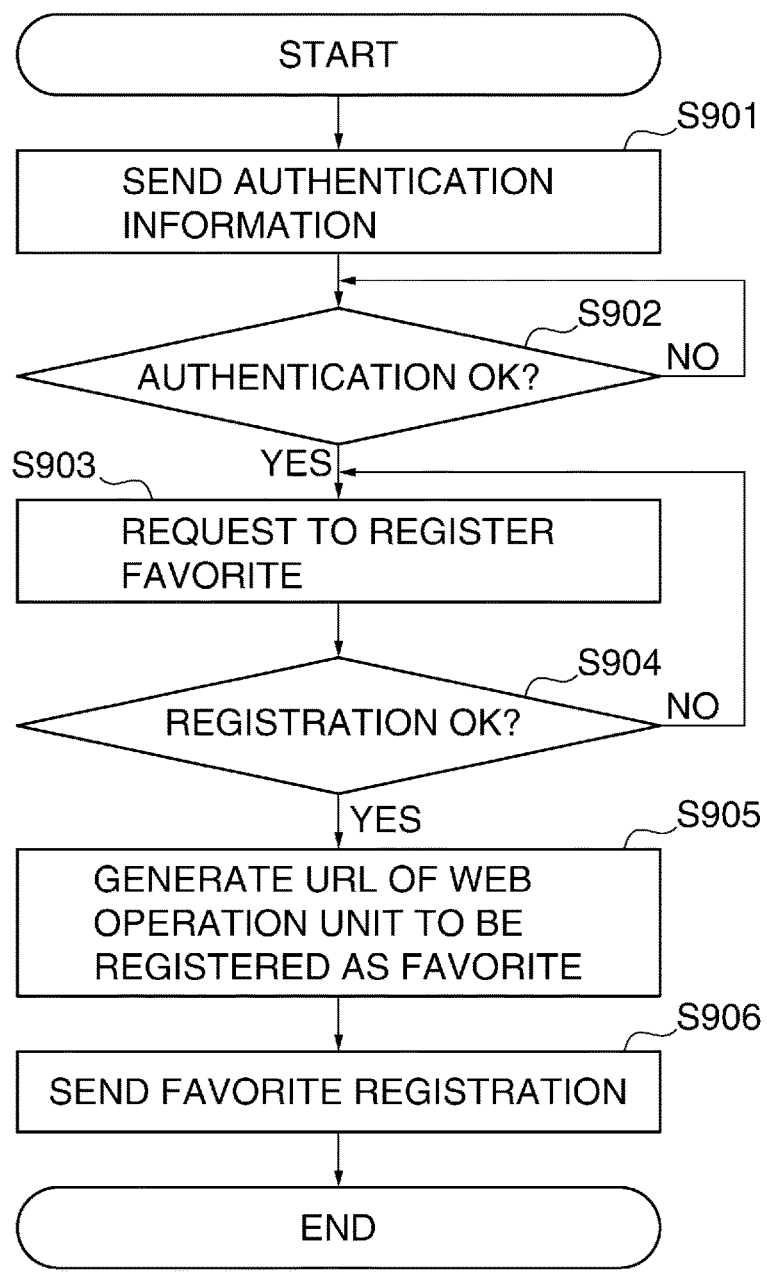
FIG. 9 is a flowchart showing a process carried out by a PDL job control unit and the PDL interface unit in the image forming system in FIG. 1 in order that the PDL controller can register its own web operation unit as a favorite in the web browser of the MFP.

FIG. 9 is a flowchart showing a process carried out by the PDL job control unit 401 and the PDL interface unit 403 in order that the PDL controller 102 can register its own web operation unit as a favorite in the web browser 404 of the MFP 103. Processes in FIG. 9 are implemented by the CPU 201 expanding programs read out from the HDD 203 into the memory 202 and executing them. It should be noted that the web browser 404 has already been activated, but the web operation unit of the PDL controller 102 has not been registered as a favorite in the web browser 404.

First, the MFP 103 and the PDL controller 102 are connected to each other, power supply to each of them is turned on to start the MFP 103 and the PDL controller 102. When power supply is turned on, the MFP 103 and the PDL controller 102 each start a booting process. Then, in step S901, the PDL interface unit 403 carries out a process to send authentication information to the MFP interface unit 405 via the PDL control cable 111. In response, the MFP interface unit 405 performs authentication and sends an authentication result to the PDL interface unit 403.

Then, in step S902, the PDL interface unit 403 waits for the authentication result from the MFP interface unit 405 and stands by until it receives the authentication result (NO in S902). When the PDL interface unit 403 receives the authentication result indicative of successful authentication (authentication OK) (YES in S902), the process proceeds to step S903, in which the PDL interface unit 403 carries out a process to send a request for registration as a favorite in the web browser 404 to the MFP interface unit 405.

It should be noted that the process in the step S903 is a process to ascertain whether or not the MFP interface unit 405 can honor the favorite registration request. Thus, the MFP interface unit 405 judges whether or not it can honor the favorite registration request and sends a judgment result to the PDL interface unit 403.

Then, in step S904, the PDL interface unit 403 judges whether or not a registration permission (registration OK) is sent from the MFP interface unit 405 as a response to the step S903. The process is returned to the step S903 until the PDL interface unit 403 receives the registration permission (NO in S904). When the PDL interface unit 403 receives the registration permission (YES in S904), the process proceeds to step S905, in which the PDL job control unit 401 generates a URL of the web operation unit. As the URL of the web operation unit, a location of a content of the web operation unit on the web server 402, which begins with the IP address of the PDL control I/F 250 is set.

Then, in step S906, the PDL interface unit 403 sends the URL and name of the web operation unit generated in the step S905 as well as a command for registration as a favorite in the web browser 404 (favorite registration command) to the MFP interface unit 405, followed by the process terminating.

Figure 10:
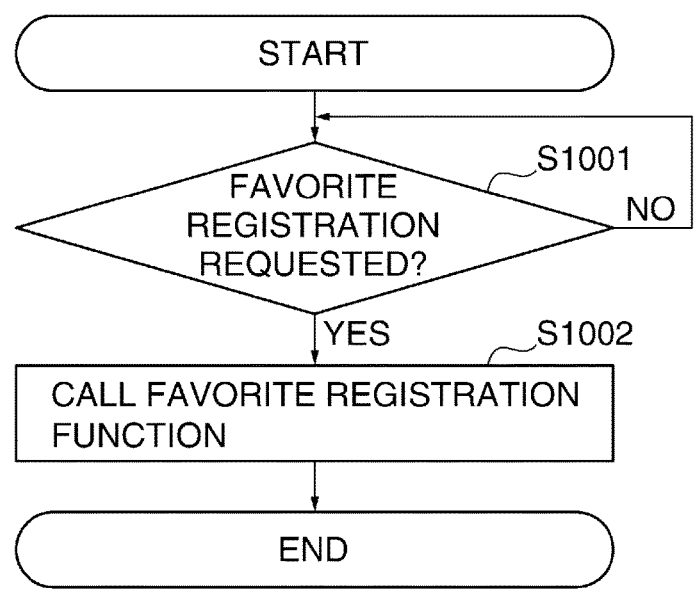
FIG. 10 is a flowchart showing a process carried out by the MFP interface unit in the image forming system in FIG. 1 when the PDL controller registers its own web operation unit as a favorite in the web browser of the MFP.

FIG. 10 is a flowchart showing a process carried out by the MFP interface unit 405 when the PDL controller 102 registers its own web operation unit as a favorite in the web browser 404 of the MFP 103. Processes in FIG. 10 are implemented by the CPU 208 expanding programs read out from the HDD 211 into the memory 209 and executing them.

In step S1001, the MFP interface unit 405 judges whether or not it has received the favorite registration command from the PDL interface unit 403. The MFP interface unit 405 stands by until it receives the favorite registration command (NO in S1001), and when it receives the favorite registration command (YES in S1001), the process proceeds to S1002. In the step S1002, the MFP interface unit 405 sets the URL and name of the web operation unit sent from the PDL interface unit 403 as well as the favorite registration command in a function to be registered as a favorite in the web browser 404 and calls the same. The subsequent process is the same as in the first embodiment, and therefore, description thereof is omitted.

As described above, according to the second embodiment, a new web operation unit of the PDL controller 102 can be registered as a favorite in the web browser 404 of the MFP controller 106 without the need to change software of the MFP controller 106.

In the first and second embodiments described above, the print server icon 308 displayed on the touch panel 301 of the MFP 103 is one of favorites in the normal web browser 404. For this reason, a favorite in the normal web browser 404 registered by a certain user may be deleted by another user, and also a favorite may be deleted by mistake. In the first and second embodiment described above, when the favorite is thus deleted, the web operation unit of the PDL controller 102 cannot be used unless the MFP 103 and the PDL controller 102 are reactivated to carry out the processes in FIGS. 5 to 8 and the processes in FIGS. 9 and 10 again, or the web operation unit of the PDL controller 102 is manually registered.

Accordingly, in a third embodiment, when there is a change of favorites in the web browser 404, the PDL controller 102 is notified of this change as an event. When the PDL controller 102's web operation unit is changed or deleted, it re-registers its own web operation unit as a favorite in the web browser 404.

Figure 11:
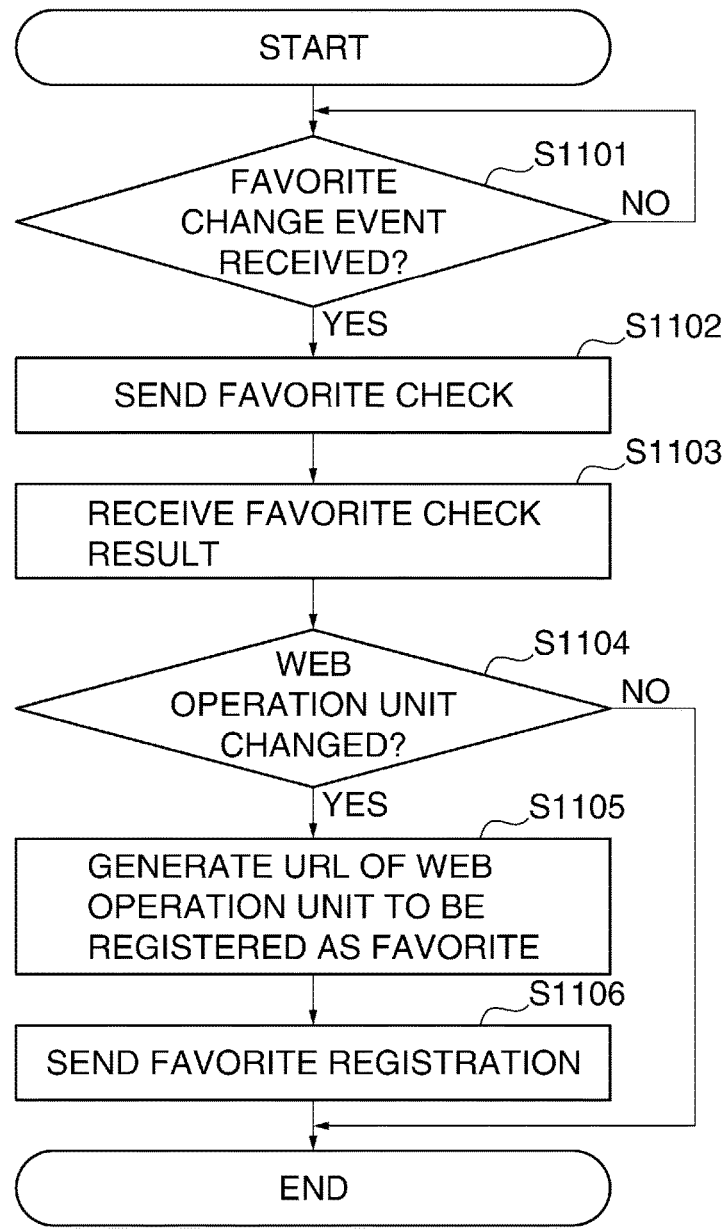
FIG. 11 is a flowchart showing a process carried out by the PDL job control unit and the PDL interface unit so as to re-register the web operation unit of the PDL controller as a favorite in the web browser of the MFP.

FIG. 11 is a flowchart showing a process carried out by the PDL job control unit 401 and the PDL interface unit 403 so as to re-register the web operation unit of the PDL controller 102 as a favorite in the web browser 404 of the MFP 103. Processes in FIG. 11 are implemented by the CPU 201 expanding programs read out from the HDD 203 into the memory 202 and executing them.

When there is a change of favorites such as addition or deletion, the web browser 404 notifies the MFP interface unit 405 of the change as an event. Upon receives this event, the MFP interface unit 405 notifies the PDL interface unit 403 of the same as an event (favorite change event).

In step S1001, the PDL interface unit 403 judges whether or not it has received the favorite change event and stands by until it receives the favorite change event (NO in S1101). When the PDL interface unit 403 receives the favorite change event (YES in S1101), the process proceeds to step S1102, in which the PDL interface unit 403 sends a favorite check command to the MFP interface unit 405.

When the MFP interface unit 405 receives the favorite check command from the PDL interface unit 403, the MFP interface unit 405 calls a function to check favorites in the web browser 404 and receives a URL list for registered favorites from the web browser 404. In response to the favorite check command, the MFP interface unit 405 sends the received URL list to the PDL interface unit 403. As a result, in step S1103, the PDL interface unit 403 receives the URL list of favorites as a response to the favorite check command.

Then, in step S1104, the PDL job control unit 401 judges whether or not a change to the web operation unit of the PDL controller 102 is included in the URL list received in the step S1103. When there is no change (NO in S1104), the process is terminated. On the other hand, when there is the change (YES in S1104), the process proceeds to step S1105, in which the PDL job control unit 401 generates a URL of the web operation unit by carrying out the same process as in the second embodiment described above. Then, in the step S1106, the PDL interface unit 403 sends a command, which is for registering the URL and name of the web operation unit generated in the step S1105 as a favorite in the web browser 404, to the MFP interface unit 405. The subsequent process is the same as in the second embodiment.

As described above, according to the third embodiment, even when a web operation unit registered as a favorite in the web browser 404 is deleted by mistake, the deleted web operation unit is automatically re-registered. As a result, the web operation unit of the PDL controller 102 can be used without reactivating the MFP 103 and the PDL controller 102 and without manually registering the web operation unit of the PDL controller 102.

In the second embodiment described above, the PDL controller 102 can freely register a desired web operation unit can be freely registered as a favorite in the web browser 404 by sending a favorite registration command. For this reason, when an added web operation unit is not desired to be displayed on the touch panel 301, a favorite corresponding thereto needs to be deleted. Moreover, in the third embodiment described above, even when a specific web operation unit is unregistered as a favorite in the web browser 404, this web operation unit is automatically re-registered. This function is inconvenient when an administrator of the apparatus does not want general users to use this web operation unit. Accordingly, to address these problems, in a fourth embodiment, the MFP 103 places limitations on registration of favorites sent from the PDL controller 102.

Figure 12:
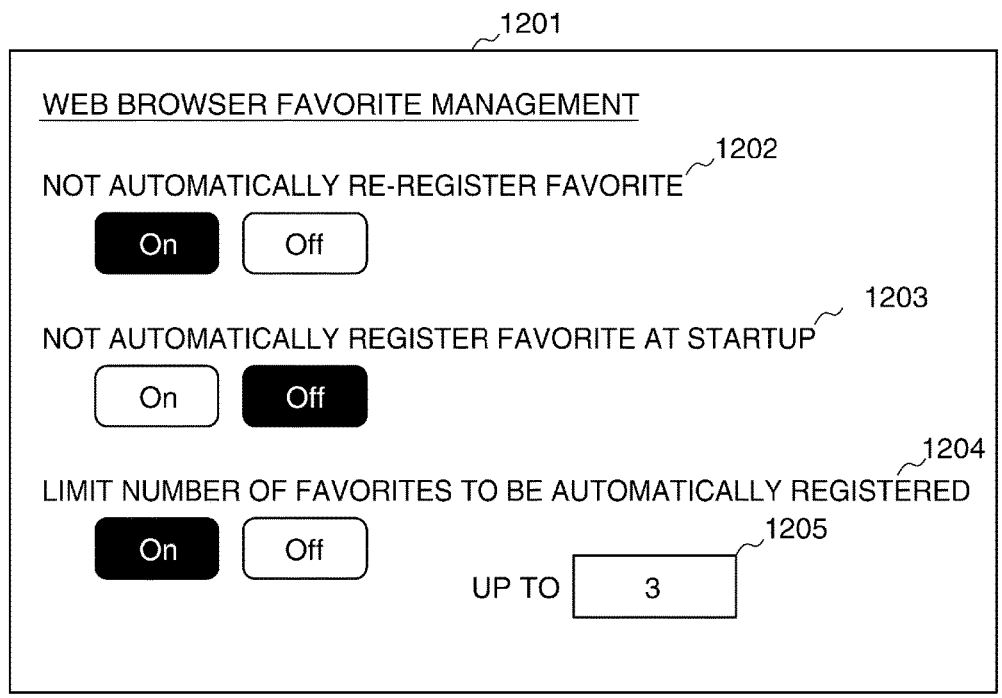
FIG. 12 is a view showing an exemplary favorite management screen of the web browser for an administrator of the MFP to configure management settings on the web browser in the image forming system in FIG. 1.

FIG. 12 is a view showing an exemplary favorite management screen 1201 (hereafter referred to as "the management screen") for an administrator of the MFP 103 to configure management settings on the web browser 404, and this management screen 1201 is displayed on the touch panel 301. Displayed on the management screen 1201 are an automatic reregistration setting button 1202, a startup registration setting button 1203, a number-of-automatic registrations limit button 1204, and a limit input button 1205.

The automatic reregistration setting button 1202 is a button for making a setting as to whether to automatically re-register a favorite in a web browser, and when the automatic reregistration setting button 1202 is on, automatic reregistration is not performed. For example, in the step S1106 described earlier, the PDL interface unit 403 sends a favorite registration command to the MFP interface unit 405. At this time, when the automatic reregistration setting button 1202 is on, the MFP interface unit 405 does not send the favorite registration command to the web browser 404 sent from by the PDL interface unit 403 in the step S1106. As a result, automatic reregistration of a favorite is not performed.

The startup registration setting button 1203 is a button for making a setting as to whether or not to automatically register a favorite in a web browser at startup of the MFP 103, and when the startup registration setting button 1203 is on, a favorite is not automatically registered at startup. For example, in the step S1001 described earlier, the PDL interface unit 403 sends a favorite registration command to the MFP interface unit 405. At this time, when the startup registration setting button 1203 is on, the MFP interface unit 405 terminates the program without calling the favorite registration function in the step S1002. It should be noted that FIG. 12 shows a state in which automatic registration at startup is enabled (OFF).

The number-of-automatic registrations limit button 1204 is a button for limiting the number of web operation units that the PDL controller 102 can be automatically registered as favorites in the web browser 404. When the number-of-automatic registrations limit button 1204 is on, the number of allowable registrations can be entered into the limit input button 1205 and is set at three here. It should be noted that a number greater than the maximum number of web operation units that can be automatically registered as favorites in the web browser 404 cannot be set in the limit input button 1205.

Figure 13:
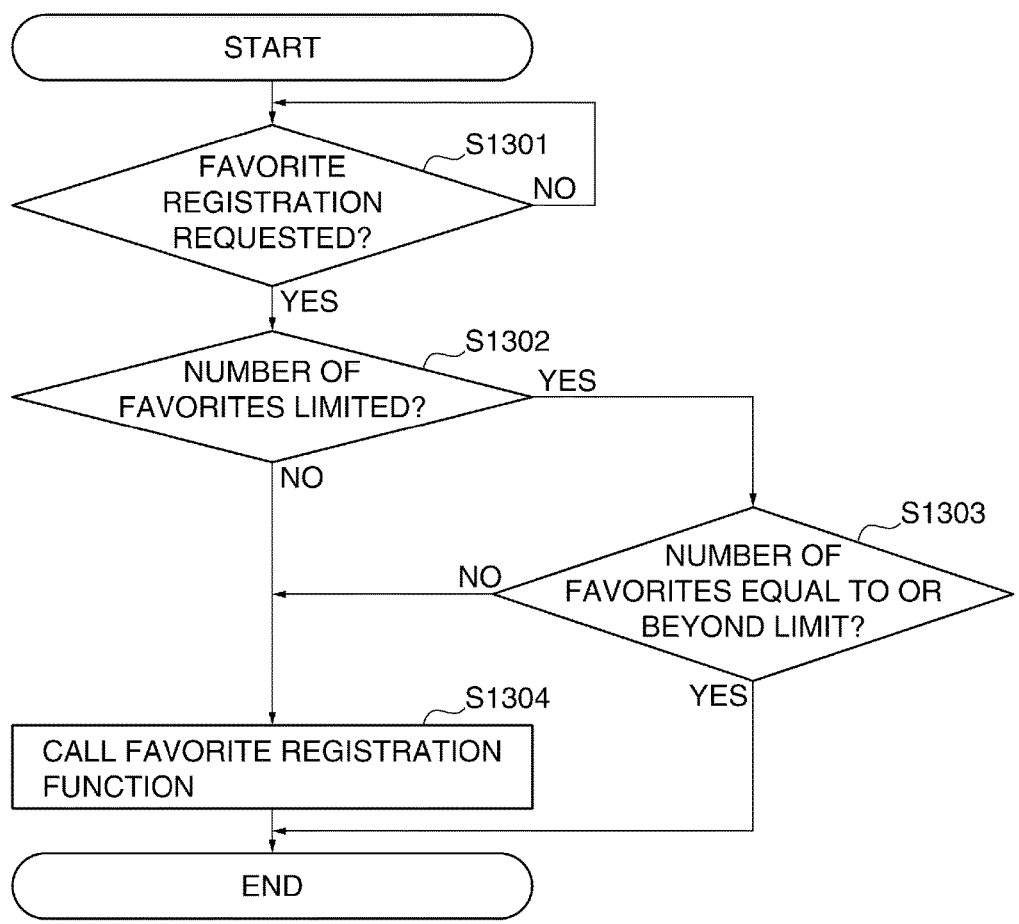
FIG. 13 is a flowchart showing a process in which the MFP interface unit limits the number of favorites that can be registered in the web browser.

FIG. 13 is a flowchart showing a process in which the MFP interface unit 405 limits the number of favorites that can be registered in the web browser 404. Processes in FIG. 13 are implemented by the CPU 208 expanding programs read out from the HDD 211 into the memory 209 and executing them.

In the step S906 or the step S1106 described earlier, the PDL interface unit 403 sends a favorite registration command to the MFP interface unit 405. In step S1301, the MFP interface unit 405 judges whether or not it has received the favorite registration command from the PDL interface unit 403 and stands by until it receives the favorite registration command (NO in S1301). When the MFP interface unit 405 receives the favorite registration command (YES in S1301), the process proceeds to step S1302, in which the MFP interface unit 405 checks a state (on/off) of the number-of-automatic registrations limit button 1204.

When the number-of-automatic registrations limit button 1204 is on (YES in S1302), the process proceeds to step S1303, in which the MFP interface unit 405 judges whether or not the number of favorites registered in the web browser 404 is equal to or greater than a number set in the limit input button 1205. When the number of registrations has reached the set number (YES in S1303), the process is terminated because more registrations cannot be made. When the number of registrations has not reached the set number (YES in S1303), the process proceeds to step S1304, in which the MFP interface unit 405 calls the favorite registration function for the web browser 404 in the same manner as in the step S1002 described above. As a result, the web browser 404 registers a favorite according to settings specified by the favorite registration function.

As described above, according to the fourth embodiment, conditions for registering web operation units as favorites in the web browser 404 (whether or not automatic reregistration is enabled, whether or not registration at startup is enabled, and a limit on the number of registrations in the case where automatic registration is enabled) can be set. As a result, the MFP 103 can be managed with ease.

Although in the embodiments described above, a web operation unit is registered as a favorite in the web browser 404, a web operation unit may be registered as a start page in place of a favorite. Moreover, in the second embodiment, not only a web operation unit but also an arbitrary URL can be registered as a favorite in the web browser 404. Further, in the second embodiment, a favorite is only registered, but as long as commands for checking and deleting favorites in the web browser 404 are prepared, favorites can be checked or deleted by changing a registration command to a check command or a deletion command.

Although in the fourth embodiment described above, exemplary conditions for registering web operation units as favorites in the web browser 404 include whether or not automatic reregistration is enabled, whether or not registration at startup is enabled, and a limit on the number of registrations in the case where automatic registration is enabled, items that can be set should not be limited to them. For example, a user interface that enables such settings as not allow changes to predetermined web operation units may be displayed on the touch panel 301.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-182979, filed Sep. 4, 2013, which is hereby incorporated by reference herein in its entirety.

What is claimed is:

1. An image forming apparatus comprising:
   a processor connected to a memory, the processor being configured to:
   determine whether a print controller for expanding print data received from an external apparatus and inputting a print job to the image forming apparatus via a cable is locally connected to the image forming apparatus;
   obtain a code from the printer controller which is connected to the image forming apparatus with a one-to-one connection by the cable;
   obtain information according to a configuration of the image forming apparatus and indicating whether the image forming apparatus is ready to connect to the print controller wherein the obtained information is originated from the image forming apparatus;
   determine whether to register the connected print controller to a menu based on that the obtained code obtained from the print controller lies inside a specific range and that the information indicating that the image forming apparatus is ready to connect to the print controller is obtained;
   specify a URL including an IP address of the connected print controller without receiving an input by a user;
   store the specified URL in a storage according to determining that the print controller is locally connected to the image forming apparatus and determining to register the connected print controller to the menu based on that the obtained code obtained from the print controller lies inside the specific range and that the information indicating that the image forming apparatus is ready to connect to the print controller is obtained;
   display a menu including a plurality of icons for executing functions of the image forming apparatus based on a user instruction for displaying the menu in a case where the specified URL is not stored in the storage;
   display a menu including the plurality of icons for executing the functions of the image forming apparatus and an icon corresponding to the specified URL in a case where the specified URL is stored in the storage; and
   receive a web page relating to the printer controller corresponding to the specified URL based on the icon corresponding to the specified URL being selected by the user, and display the received web page.

2. The image forming apparatus according to claim 1, wherein the URL including the IP address of the print controller and character strings held at least before starting communication with the print controller is generated.

3. The image forming apparatus according to claim 1,
   wherein the processor is further configured to store the URL and a name of the icon as a shortcut to the web page in the storage, and
   wherein the name of the icon is displayed together with the icon corresponding to the specified URL on the menu.

4. The image forming apparatus according to claim 1, further comprising a print device,
   wherein the processor is further configured to cause the print device to print an image on a sheet based on image data received from the print controller.

5. The image forming apparatus according to claim 1, wherein an IP address of a gateway to the image forming apparatus is obtained as the IP address of the print controller.

6. The image forming apparatus according to claim 1, wherein the information according to the configuration of the image forming apparatus is information set by operating a hardware switch of the image forming apparatus.

7. The image forming apparatus according to claim 1, wherein by referring to an IP address of a gateway to the image forming apparatus, the IP address of the print controller is obtained to specify the URL.

8. The image forming apparatus according to claim 7, wherein the image forming apparatus holds the IP address of the gateway to the image forming apparatus as the IP address of the print controller.

9. The image forming apparatus according to claim 1, wherein the code indicates a model of the print controller.

10. The image forming apparatus according to claim 1, wherein the specified URL stored in the storage is used as a bookmark in a web browser of the image forming apparatus.

11. The image forming apparatus according to claim 1, wherein at least an icon for selecting a copy function of the image forming apparatus is displayed on the menu.

12. The image forming apparatus according to claim 1, wherein the plurality of icons and the icon corresponding to the specified UL are displayed as a list on a single menu screen.

13. A control method for an image forming apparatus comprising:
   a first determination step of determining whether a print controller for expanding print data received from an external apparatus and inputting a print job to the image forming apparatus via a cable is locally connected to the image forming apparatus via the interface;

a first obtaining step of obtaining a code from the printer controller which is connected to the image forming apparatus with a one-to-one connection by the cable;
a second obtaining step of obtaining information according to a configuration of the image forming apparatus and indicating whether the image forming apparatus is ready to connect to the print controller wherein the obtained information is originated from the image forming apparatus;
a second determination step of determining whether to register the connected print controller to a menu based on that the obtained code obtained from the print controller lies inside a specific range and that the information indicating that the image forming apparatus is ready to connect to the print controller is obtained;
a specification step of generating a URL including an IP address of the connected print controller without receiving an input by a user;
a storing step of storing the specified URL in a storage according to determining that the print controller is locally connected to the image forming apparatus and determining to register the connected print controller to the menu based on that the obtained code obtained from the print controller lies inside the specific range and that the information indicating that the image forming apparatus is ready to connect to the print controller is obtained;
a display step of displaying a menu including a plurality of icons for executing functions of the image forming apparatus based on a user instruction for displaying the menu in a case where the specified URL is not stored in the storage
and displaying a menu including the plurality of icons for executing the functions of the image forming apparatus and an icon corresponding to the specified URL in a case where the specified URL is stored in the storage; and
a receiving step of receiving a web page relating to the printer controller corresponding to the specified URL based on the icon corresponding to the specified URL being selected by the user, and displaying the received web page.

14. A non-transitory computer-readable storage medium storing a program for causing a computer of an image forming apparatus to execute a control method for the image forming apparatus, the control method comprising:
a first determination step of determining whether a print controller for expanding print data received from an external apparatus and inputting a print job to the image forming apparatus via a cable is locally connected to the image forming apparatus via the interface;
a first obtaining step of obtaining a code from the printer controller which is connected to the image forming apparatus with a one-to-one connection by the cable;
a second obtaining step of obtaining information according to a configuration of the image forming apparatus and indicating whether the image forming apparatus is ready to connect to the print controller wherein the obtained information is originated from the image forming apparatus;
a second determination step of determining whether to register the connected print controller to a menu based on that the obtained code obtained from the print controller lies inside a specific range and that the information indicating that the image forming apparatus is ready to connect to the print controller is obtained;
a specification step of generating a URL including an IP address of the connected print controller without receiving an input by a user;
a storing step of storing the specified URL in a storage according to determining that the print controller is locally connected to the image forming apparatus and determining to register the connected print controller to the menu based on that the obtained code obtained from the print controller lies inside the specific range and that the information indicating that the image forming apparatus is ready to connect to the print controller is obtained;
a display step of displaying a menu including a plurality of icons for executing functions of the image forming apparatus based on a user instruction for displaying the menu in a case where the specified URL is not stored in the storage
and displaying a menu including the plurality of icons for executing the functions of the image forming apparatus and an icon corresponding to the specified URL in a case where the specified URL is stored in the storage; and
a receiving step of receiving a web page relating to the printer controller corresponding to the specified URL based on the icon corresponding to the specified URL being selected by the user, and displaying the received web page.

15. An image forming apparatus comprising:
a processor connected to a memory, the processor being configured to:
determine whether a print controller for expanding print data received from an external apparatus and inputting a print job to the image forming apparatus via a cable is locally connected to the image forming apparatus;
obtain a code from the printer controller which is locally connected to the image forming apparatus with a one-to-one connection by the cable;
obtain information according to a configuration of the image forming apparatus and indicating whether the image forming apparatus is ready to connect to the print controller wherein the obtained information is originated from the image forming apparatus;
determine whether to register the connected print controller to a bookmark in a web browser based on that the obtained code obtained from the print controller lies inside a specific range and that the information indicating that the image forming apparatus is ready to connect to the print controller is obtained;
specify a URL including an IP address of the print controller without receiving an input by a user;
register the specified URL automatically as the bookmark in the web browser according to determining that the print controller is locally connected to the image forming apparatus and determining to register the connected print controller to the bookmark based on that the obtained code obtained from the print controller lies inside a specific range and that the information indicating that the image forming apparatus is ready to connect to the print controller is obtained; and
display a screen for selecting the URL registered as the bookmark.

* * * * *